United States Patent
Novak et al.

(10) Patent No.: US 6,393,419 B1
(45) Date of Patent: May 21, 2002

(54) MULTIPOINT DATABASE SYNCHRONIZATION PROTOCOL TO AVOID DATA CORRUPTION

(75) Inventors: Lars Novak, Bjärred (SE); Jörgen Birkler, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/457,371

(22) Filed: Dec. 9, 1999

Related U.S. Application Data (60) Provisional application No. 60/119,028, filed on Feb. 8, 1999.

(51) Int. Cl.[7] .................................................. G06F 17/30
(52) U.S. Cl. ............................ 707/8; 707/10; 707/201; 707/204; 707/229; 710/200; 714/20
(58) Field of Search ............................ 707/8, 10, 201, 707/204, 229; 710/200; 714/20

(56) References Cited

U.S. PATENT DOCUMENTS

| | | |
|---|---|---|
| 5,247,684 A | 9/1993 | Taveres et al. |
| 5,307,487 A | 4/1994 | Taveres et al. |
| 5,499,367 A | 3/1996 | Bamford et al. |
| 5,666,530 A | 9/1997 | Clark et al. |
| 5,692,178 A | 11/1997 | Shaughnessy |
| 5,706,509 A | 1/1998 | Tso |
| 5,710,922 A | 1/1998 | Alley et al. |
| 5,745,905 A | 4/1998 | Larsson et al. |
| 5,761,672 A | 6/1998 | Samuelsson et al. |
| 5,799,320 A | 8/1998 | Klug |
| 5,829,001 A | 10/1998 | Li et al. |
| 5,845,292 A | 12/1998 | Bohannon et al. |
| 5,870,759 A * | 2/1999 | Bauer et al. ............... 707/201 |
| 5,870,765 A | 2/1999 | Bauer et al. |
| 5,873,096 A | 2/1999 | Lim et al. |
| 5,926,816 A * | 7/1999 | Bauer et al. .................... 707/8 |
| 6,026,401 A * | 2/2000 | Brealey et al. ................ 707/8 |
| 6,061,683 A * | 5/2000 | Alonso ........................... 707/8 |
| 6,189,007 B1 * | 2/2001 | Boonie et al. .................. 707/8 |

FOREIGN PATENT DOCUMENTS

| | | |
|---|---|---|
| GB | 2 307 760 A | 6/1997 |
| WO | WO 98/59305 | 12/1998 |

OTHER PUBLICATIONS

International Search Report Date of Completion: Apr. 26, 2000 Date of Mailing: May 17, 2000.

* cited by examiner

Primary Examiner—Safet Metjahic
Assistant Examiner—Haythim Al-Aubaidi
(74) Attorney, Agent, or Firm—Burns, Doane, Swecker & Mathis, L.L.P.

(57) ABSTRACT

A database multipoint synchronization which allows multiple clients to simultaneously access and edit a database while avoiding inadvertent data corruption and ensuring the integrity of data within the database. A database manager, which may be configured as part of a database software application, keeps track of modifications saved to a database file and increments a modification change counter accordingly. When a client user accesses a database record, the database manager detects the modification change counter value. Then if that client seeks to save modifications to the database record, the database manager detects the current modification change counter value to discern whether other clients have saved modifications to the record following the access by the client presently seeking to save modifications. If the modification change counter has incremented, the client is denied authorization to save the modifications and offered a choice of alternative operations. In this way, the data within the database record is not corrupted due to inadvertently overwriting by another client's record.

14 Claims, 6 Drawing Sheets

MULTIPOINT DATABASE SYNCHRONIZATION PROTOCOL TO AVOID DATA CORRUPTION

This application claims priority under 35 U.S.C. §§119 and/or 365 to No. 60/119,028 filed in the United States of America on Feb. 8, 1999; the entire content of which is hereby incorporated by reference.

BACKGROUND OF THE INVENTION

1. Field of the Invention

This invention generally pertains to computer applications which are accessed simultaneously by multiple clients. In particular, the present invention is drawn to a method and system which allows multiple clients to simultaneously access and edit a database.

2. State of the Art

A database is a logically structured collection of data, organized to be accessed by, and useful to, a human user, a software application, or a machine based logic function. A database is generally embodied in the form of a computer program or software application residing within a storage device, but may simply be a set of rules for organizing and accessing data in a useful manner. A database system includes a computer for storing and manipulating the database, input/output (I/O) devices for entering data and displaying, or otherwise outputting, the results, and communication or network links to interconnect the various parts of the database system. The database system may be thought of as the physical system (e.g., the computer terminals, data links, I/O devices, memories, etc.) while the database itself represents the information to be stored and manipulated. In practice, however, the term database and the term database system, are often used interchangeably.

A database system having a database enables data to be conveniently stored, retrieved, manipulated, mathematically transformed, copied, or linked to data within the same database or different databases or files. This is achieved by storing data indexes and/or reference information along with the data of a database. Databases are typically stored on permanent or semi-permanent storage systems, often called non-volatile memory which enables data storage without an uninterrupted supply of power. By contrast, data in volatile memory must have a continuously uninterrupted supply of power, to avoid loss of data. U.S. Pat. No. 5,745,905 issued to Larsson et al., which pertains to database storage in memory, is herein incorporated by reference in its entirety.

A database system may be configured for use by multiple users. For example, a retail store may find it useful to maintain an inventory database linked to the cash registers, the warehouse, and the accounting department. An inventory database of this configuration might allow various activities within the store to be updated simultaneously. For instance, upon the occurrence of a sale, the cash registers recording the sales may update the retail inventory database to reflect the fact that the stock on-hand in the store has been reduced by the sale. When the database indicates that the stock on-hand in the store has dropped below a certain level, the warehouse, which is also linked to the database, is prompted to ship more merchandise to the store. Furthermore, the accounting department may also be linked to the database to update its cash flow and tax liability information based upon the information of the database. Accordingly, the database may be updated by either the cash register, upon making a sale, the warehouse, upon receiving/transferring goods, or the accounting department, upon the occurrence of a transaction.

The users of a database system are often referred to as clients. A database client may be a human user entering or modifying database data via a computer keyboard, digital pen, barcode wand, voice recognition system, or the like. A database client can also be a sensor, counter, detector, monitoring device, computer program or logic, or other like system capable of generating or modifying database data.

A database manager performs data operations such as transforming the value of the data, and manipulating the data by copying, moving, linking, or otherwise changing the state of the data. Another important function of the database manager is the control of access to the database. That is, the database manager controls client access to data within a database, including controlling simultaneous client access to data in a multi-user database. A database manager is typically a computer program/subprogram or software application that exercises a set of rules or logic which organize data and limit access to the data within a database. In the present context, the term database manager is used in reference to the computer or physical processing device within which the database manager function or logic resides.

Figure 1A:
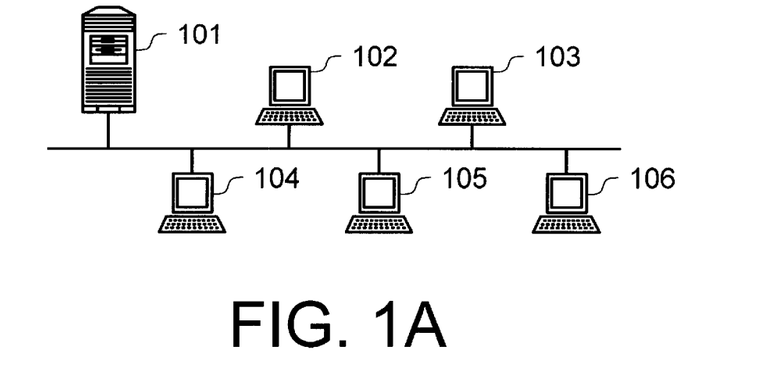
FIGS. 1A–1D are computer system configurations with a database manager connected to multiple clients.
Figure 1B:
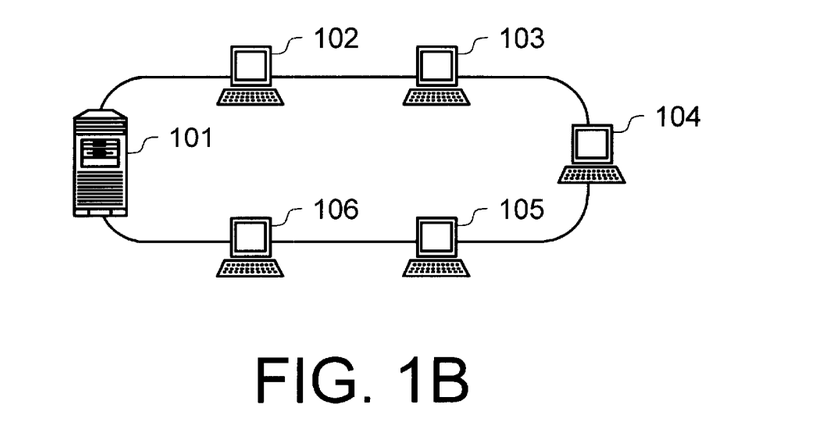
Figure 1C:
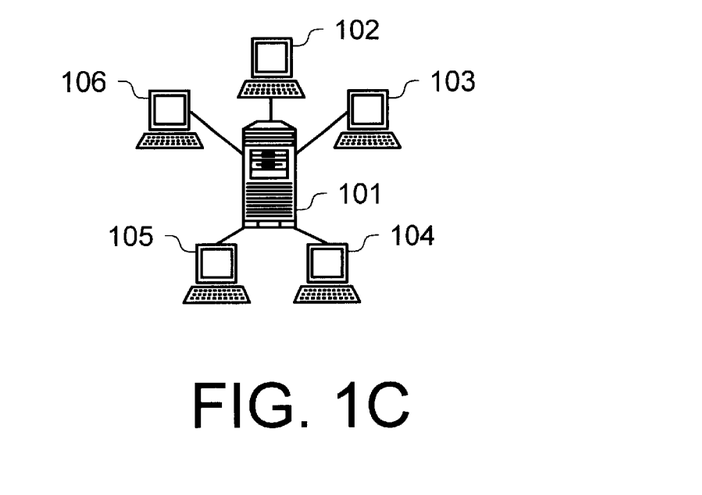
Figure 1D:
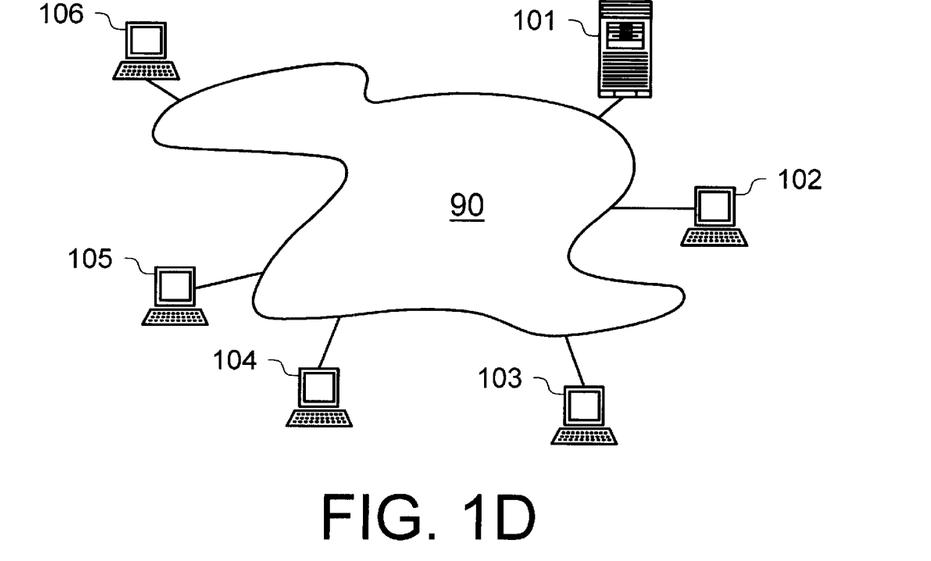

FIGS. 1A–D illustrate a database manager 101 and clients 102–106. The database manager 101 is reflected in the figures in the form of a file server. In practice, the data manager 101 may be embodied in any of various types of computers or processing devices. The data manager function may be performed in the same type of computer as the clients. The physical configuration of the database manager in relation to the clients may take many forms, as shown in FIGS. 1A–D. For instance, the database manager 101 may be connected to the clients 102–106 in the bus configuration of FIG. 1A, the round-robin configuration of FIG. 1B, the star configuration of FIG. 1C, or the communication network configuration of FIG. 1D. In FIG. 1D the database manager 101 communicates with database clients 102–106 via a communications network 90. The communications network 90 may be the Internet, an intranet, a local area network (LAN), the PSTN, a wireless network, or other like network for communications among nodes or users.

In general, the database manager may be either centrally located, or the functions associated with the database manager may be distributed amongst various network nodes, resources and/or database clients. For example, in any of FIGS. 1A–1D, the database manager could either be solely located in one computer, such as computer 101, or the functions associated with the database manager could be distributed amongst the computers 101–106. In the case of a distributed database manager, it is desirable to have a scheme in place for communication among the different portions of the database manager to enable coordination of database manager operations. U.S. Pat. No. 5,761,672 to Samuelsson et al., pertaining to a distributed database system, is herein incorporated by reference.

In a multi-user database, the clients may access a database from a single access point at different times, or several clients may simultaneously access the database at once. The simultaneous access of a database by multiple clients can give rise to data corruption, that is, the inadvertent overwriting or modification of one client's data by another client. For instance, one client may edit data and save it, overwriting the modifications of another client. In the present context, the terms edit and modify are used interchangeably, and include the acts of deleting, adding or in any way altering the data in a database. A database integrity scheme is required to avoid data corruption due to simultaneous database operations by multiple users, in which the multiple users edit the data of the database.

One conventional integrity scheme involves limiting access for the purpose of editing the database to only one client at a time. Under this scheme, only one client is permitted to access the database for the purposes of making changes to the data of a file or a record of the database. Other clients may be permitted to access a database record or file on a read-only basis, but are not allowed to edit the database. In other words, all but one client remain locked out of the database record/file for editing purposes. While such a scheme ensures integrity of the database, it unduly burdens the usefulness of having a multi-client database system.

According to another conventional database integrity scheme, a new, unique identifier of the record being modified is assigned when there are two or more clients attempting to simultaneously edit the same record. Thus, multi-user editing is allowed, but it results in multiple versions of the database record or of the entire database file. This database integrity scheme is disadvantageous because it requires excessive amounts of memory due to the saving and storage of multiple versions of the database. In addition, this scheme is not truly a multi-user database system since new iterations or versions of the same record or file are formed each time two or more clients seek to modify the same record.

Therefore, a need presently exists for an improved method of ensuring database integrity during multi-user editing of the database.

SUMMARY OF THE INVENTION

The present invention ensures database integrity while allowing simultaneous multiple-client access for editing the database. In general, the present invention accomplishes this by using a change counter value which tracks the modification status of various database records to avoid a data corruption situation. Accordingly, it is an object of the present invention to provide a method for multiple clients to access and save records to a database without data corruption.

In accordance with one aspect of the present invention, the above-identified and other objects are achieved for a first client accessing a database record. Upon allowing the first client to access the database record, a database manager stores a change counter value (CCV). The CCV has a first value corresponding to the state of the database when the first client accessed the database record. If a modified version of the database record is saved by a second client after the first client has accessed the record, the CCV is incremented. Then, if the first client seeks to save the database record, the database manager denies the first client's request since the CCV value is changed, indicating that the first client would be overwriting the modifications of the second client.

BRIEF DESCRIPTION OF THE DRAWINGS

Other objects and advantages of the present invention will become apparent to those skilled in the art, upon reading the following detailed description of preferred embodiments in conjunction with the accompanying drawings, wherein like reference numerals have been used to designate like elements, and wherein.

DETAILED DESCRIPTION OF THE PREFERRED EMBODIMENTS

Figure 2:
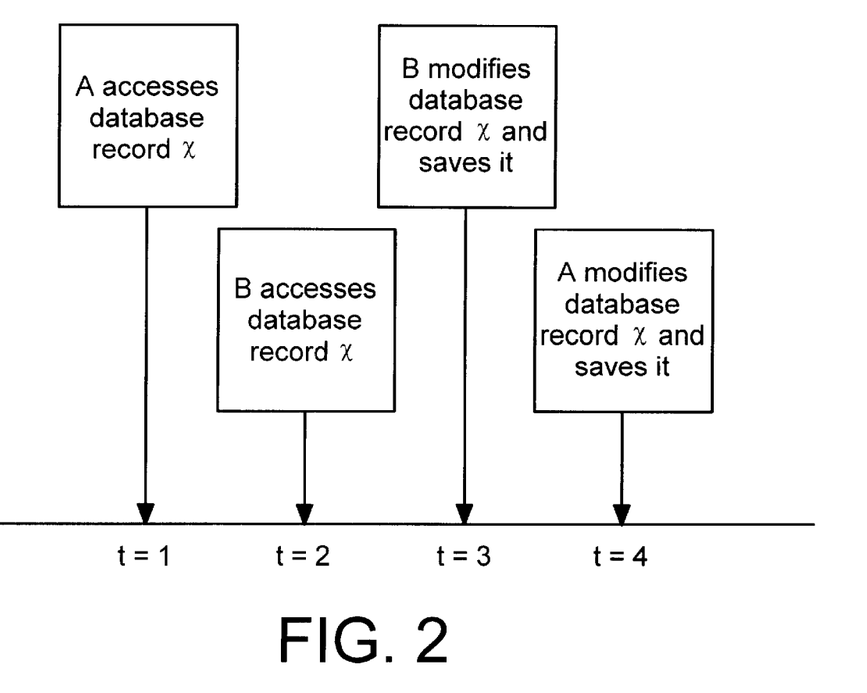
FIG. 2 depicts a multi-user database situation which may result in corruption of a client's data within a database.

FIG. 2 depicts a multi-user database situation which may result in corruption of a client's data within a database. At time t=1, client A accesses database record X. In the present context, the term "database record" is used in reference to a portion of a database being edited. A database record may be as much as an entire database file, as little as a single bit of information, or any other portion of a database. At time t=2, client B accesses the same database record (i.e., record X), which has not yet been modified and saved by client A. Of course, in practice database corruption may also occur when client B accesses the record X before client A (e.g., at time t=0). At time t=3, client B edits, deletes, or otherwise modifies the record X, and thereafter saves the modification. Neither client A nor client B is aware of any modifications to the record X by the other, since client A and client B are each working with copies of the record X downloaded to them at time t=1 and time t=2, respectively.

If, as shown in FIG. 2, client A modifies record X at time t=4, then client B's modifications will be lost when client A saves the modified record X. The act of client A saving the database record at time t=4 wipes out any modifications that client B has previously made and saved, since the version of the record X client A has now edited and is saving is from time t=1, previous to time t=3 when the modifications of client B were saved.

Thus, without a sufficient database synchronizing scheme in place, data corruption results at time t=4 when client A saves the newly modified version of record X, thereby over-writing client B's previously saved modifications. A database corruption situation is likely to occur whenever multiple database clients simultaneously edit and save portions of the same database data, unbeknownst to each other.

Throughout this description, the activities of client A and client B are described in terms of accessing record X, then editing and saving a modified record X. In effect, when a client performs editing, the client is creating a modified version of the record X which only that client has access to until it has been saved. When it has been saved, the modified version of the record X becomes the record X. Any client who thereafter accesses the record X, will be retrieving the previously modified, saved version of the record X.

Figure 3:
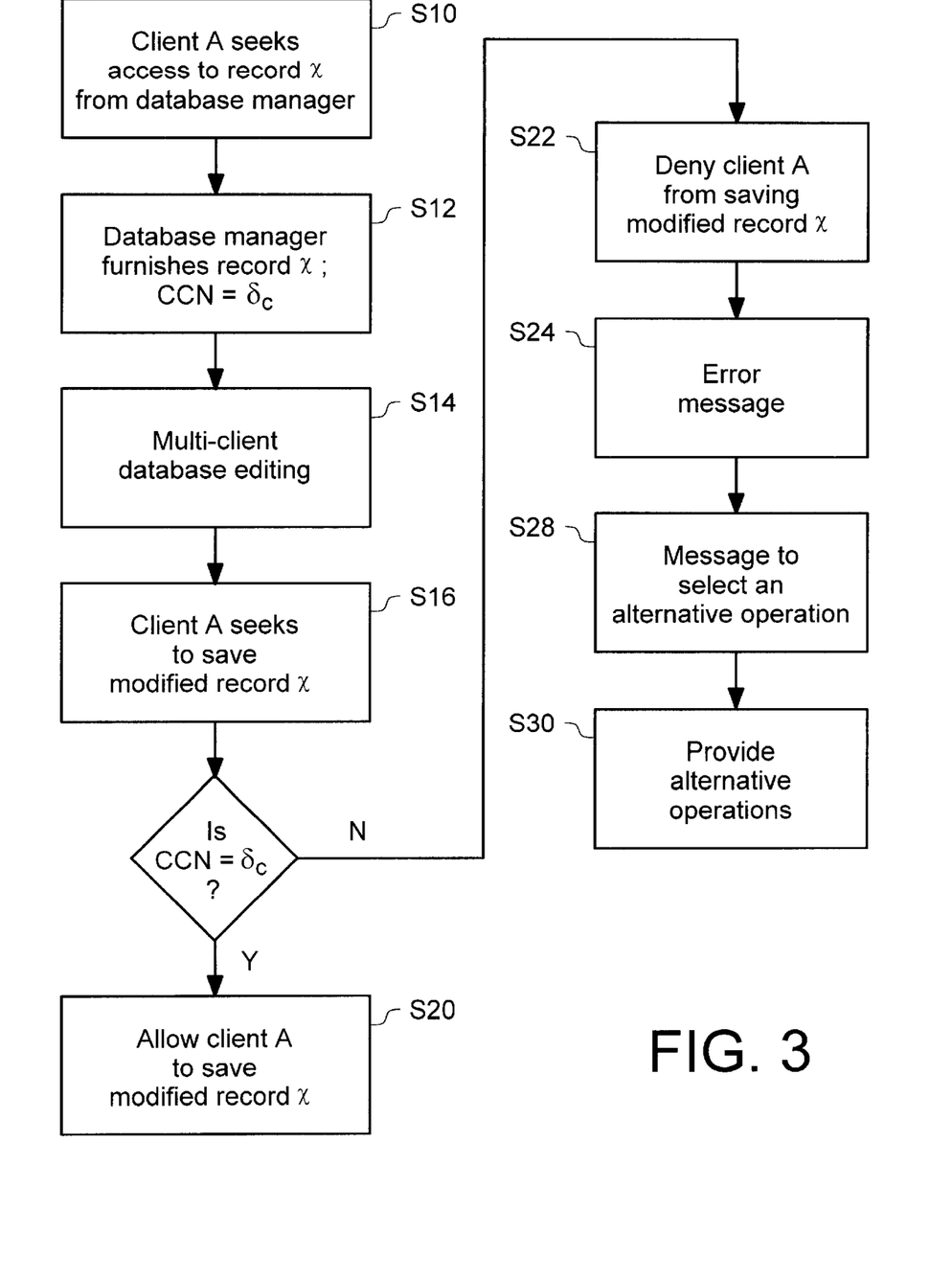
FIG. 3 depicts the steps associated with a database synchronizing method according to an exemplary embodiment of the present invention.

FIG. 3 depicts the steps associated with a database synchronizing method according to an exemplary embodiment of the present invention. In step S10 client A seeks to access a record of a database, for example, record X. The client A may seek access to record X by contacting or requesting permission from a database manager which controls access to the database records among various multiple clients using the database. For example, the client A may be a retail store cash register accessing and updating the inventory database to reflect the sale of an item. As an alternative step for this or other embodiments, the client A need not request permission in order to access the record X, in which case the database manager simply monitors the client's access while performing operations to ensure data integrity.

In step S12 according to an exemplary embodiment, the database manager grants access and furnishes or downloads a copy of the record X to client A, along with a change counter value (CCV) for the record X. The use of CCVs provides a mechanism for tracking the modification status of various database records. The CCV need not be an actual number, but can instead be any value which can be incremented up or down, or changed to a different value. For example, the CCV may be a letter of the alphabet, the time of day or date, the size of the file or record, the number of words or letters in the record, a parity check, or other like measurement of the database record. For the sake of illustration, the CCV will be described as a numerical value in the present disclosure. Each time a record is modified and saved by a client, the value of the CCV for that record is incremented by one. In the example illustrated by FIG. 3, at the time client A is granted access to the record X the CCV=$\delta_c$. The first time a modification to record X is saved, the change counter is incremented by one to a value of CCV=$\delta_c$+1. In short, the CCV=$\delta_c$ serves as a reference point which indicates the state of database record X at the point in time when client A accessed record X.

Step S14 represents a period of time during which multi-client database editing may take place on the record X. In step S14, clients other than client A may edit the record X, and attempt to save it after the database manager has furnished record X to client A it in step S12. For the purposes of determining a potential data corruption situation according to the present invention, it does not matter whether the other clients accessed record X before client A or after client A. It matters only that the other clients saved modifications to the record X following client A's access to the record, as indicated by CCV=$\delta_c$ as depicted in the multi-client database editing situation of FIG. 2.

According to the present invention, client A will be able to edit the record X and then save the changes to the database, so long as no other client has saved modifications to the record X after the point and time in which client A accessed the record X. Since the state of the record X is determined by reference to the CCV, the database manager can grant client A permission to save the modified record X for as long as CCV=$\delta_c$ without causing data corruption. Because the CCV has the same value as when client A accessed it for the purpose of making modifications, there have been no subsequent modifications saved to record X which would be inadvertently overwritten by client A's modifications. In other words, client A will be granted permission to save the modified record X only if the corresponding CCV for record X has not changed in value since the client A accessed the record X.

In step S16, client A, having made modifications to the record X, now seeks to save the modified record X. Before saving the modified record X, client A requests permission from the database manager to save the record. If client A is permitted to save the modified record X at this point and time, and another client has saved record X modifications subsequent to CCV=$\delta_c$ (when client A accessed the record X), then data corruption will result since the modifications of the other client would be over-written by client A.

To avoid data corruption, the database manager compares the present value of CCV to $\delta_c$ in association with step S18, to ascertain whether record X has been modified subsequent to client A accessing the record X in step S12. If, in accordance to the "YES" path out of step S18, the database manager determines that CCV=$\delta_c$, the method proceeds to step S20 and client A is granted permission to save the modified record X. On the other hand, if in accordance to the "NO" path out of step S18, the database manager determines that CCV>$\delta_c$ the method proceeds to step S22 and client A is not granted permission to save the modified record X. In step S22, the determination that CCV>$\delta_c$ results in a denial of the option to save the modified record X by client A.

In step S24, an error message is sent to client A, informing the client A that its request to save the modified record X has been denied. If the client is using a display, e.g., a computer screen, cellular telephone display, television monitor, etc., an exemplary form of the error message of step S24 may be as follows:

ERROR: PERMISSION TO SAVE RECORD X IS DENIED.
RECORD X WAS MODIFIED AFTER ACCESS BY CLIENT A.

Alternatively, the error message could be conveyed in any equivalent manner known to those of skill in the art. Such equivalents include a print-out, an audible system, or other like signaling method or apparatus. Upon informing the client A by displaying the error message or other signaling means, the method then proceeds to step S28 where a message is conveyed to the client A requesting the client A to select one or more alternative operations available to client A. In step S30. client A may then perform an alternative operation following the denial of saving the modified record X.

Figure 4:
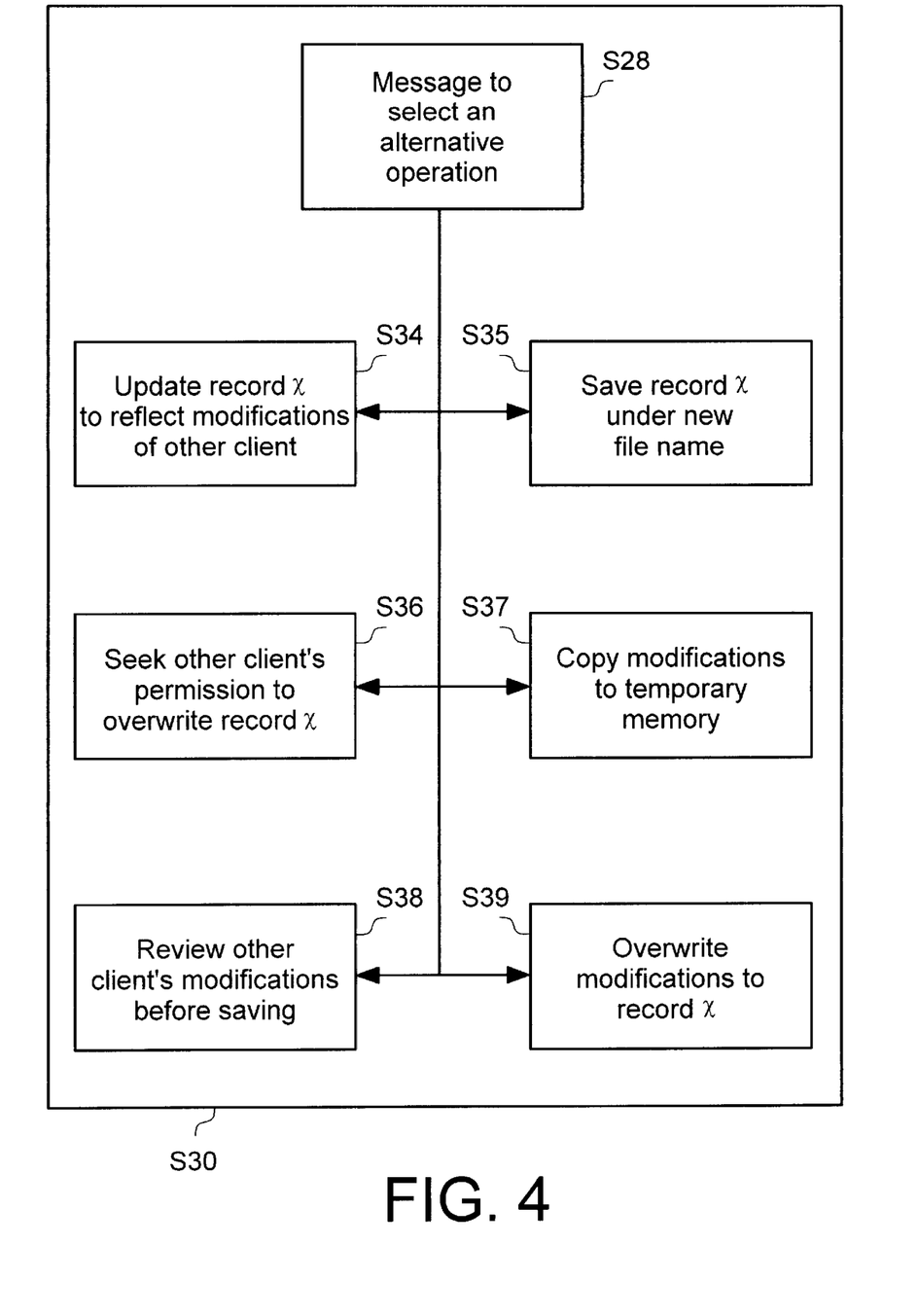
FIG. 4 depicts a number of alternative operations available to a client upon denial of permission to save a modified record.

FIG. 4 depicts a number of alternative operations available to client A if client A is denied permission to save the modified record X. Following the step S24 in which an error message is sent to the client A, the step S28 is performed. In the step S28, a message is conveyed to the client A which requests the client A to select one or more of the alternative operations available to client A. The alternative operations may include, for example, any combination of one or more of the operations described in conjunction with each of steps S34–S39. Other alternative operations known to those of skill in the art may be available to client A upon denial of permission to save a modified record.

In step S34, the client A can choose to have the record X it is accessing be updated to incorporate any previously saved modifications of the other client, that is, from step S14 of FIG. 3. This ensures that the client A's record X reflects the other client's modifications before client A saves the record X. The alternative operation of step S34 can be implemented in different manners. For instance, the other client's previously saved modifications can be updated only so long as the modifications of the other client and client A are not in conflict. Alternatively, the other client's previously saved modifications can be updated regardless of whether any conflict between the client A's changes and the previously saved changes exist. Or else the other client's previously saved modifications can be updated fully or partially based on which client accessed the record first, which client has a higher priority, or other like criterion.

Step S35 allows the client A to save the modified record as a new record or under a new file name. To avoid needlessly creating multiple file versions of the same data record, it is preferable to avoid saving modified records under a new file name until a data corruption situation arises. In other words, the option afforded in step S35 would, preferably, only be available in the situation where the modified record X had been saved by another client resulting in CCV>$\delta_c$ and resulting in conflicting data because of the modifications, rather than when two clients merely accessed the same record simultaneously.

In step S36, the client A is given the option of allowing the other client, who's record X could potentially be corrupted, to review client A's modifications before client A is allowed to save them. Typically, the situation in which another client's record X could potentially be corrupted arises when another client has saved record X following client A's access to the record X. Such a situation arises, for instance, in the step S14 of FIG. 3. Step S36 is particularly useful when another client, for instance client B, has accessed record X but has not made a substantive modification to record X. For example, client B may have accessed record X and inadvertently inserted a space by hitting the keyboard space bar while scrolling around in the record X. In this situation, client B would undoubtedly allow client A to save client A's modified record X, since client B has made no substantive modifications to the record X which would be corrupted. Step S36 can be implemented by giving the other client who's modifications would be corrupted, that is, client B, the option of allowing client A to save the record X either after showing client A's modifications to be saved to client B, or after querying client B for permission to save the modified record X of client A but not showing client A's modifications to be saved to client B.

In step S37, client A is afforded the option of copying the modified portions of record X to a temporary memory, such as a "clipboard" in a computer or computer application. Having temporarily saved the modifications, the client A then is able to retrieve the most recent version of record X for which $CCV > \delta_c$. Client A can then modify the most recent version of record X by "pasting in" the modifications of the record X temporarily saved in the clipboard. In this way client B's modifications would not be inadvertently destroyed by client A.

In step S38, the client A is allowed to pull up a copy of the previously saved modifications to record X of the other client to view them, before the client A saves the present modifications. This allows client A the opportunity to, for instance, determine whether the previously saved modifications are substantive enough to warrant steps for avoiding corruption from overwriting the previously saved modifications of the other client, or to view the modifications for other editing purposes.

Finally, in step S39, the client A is allowed to save modifications to the record X without regard to any other previously saved modifications. This alternative, of course, would result in the corruption of any previously saved modifications to the record X, an alternative which may be acceptable, for instance, if the various clients have predetermined authorizations for making modifications, as discussed in conjunction with FIG. 5.

Figure 5:
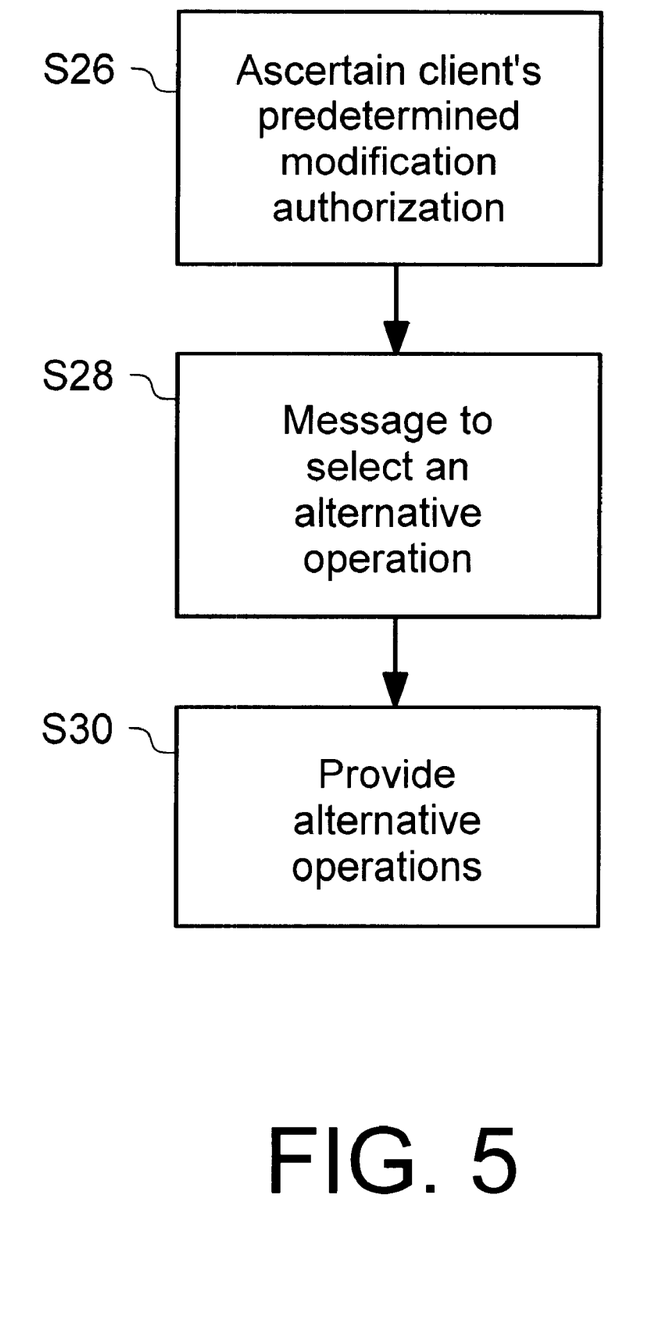
FIG. 5 depicts an embodiment in which the alternative operations available to a client are based upon predetermined modification authorization.

FIG. 5 depicts an embodiment in which the alternative operations available to a client are based upon predetermined modification authorization. According to this embodiment, prior to accessing the record X in step S10 of FIG. 3, the client A is assigned a level of predetermined modification authorization for making modifications to the database record or records. The predetermined modification authorization of a particular client may either be the same for all records of a database, or may alternatively be assigned on a record-by-record basis for each record of the database.

In step S26, preferably performed prior to step S30 of FIG. 3, the database manager retrieves client A's predetermined modification authorization to determine whether any limitations are to be placed on client A's permission to save modifications. The alternative operations conveyed to the client A in step S28, that is, access to steps S34–S39 of FIG. 4, are determined by the predetermined modification authorization specific to that client.

For example, a client granted a predetermined modification authorization corresponding to an extensive level of access may be able to exercise any one of the alternative operations of steps S34–S39. On the other hand, a client with a predetermined modification authorization corresponding to a limited level of access may be able to access only a subset of the alternative operations of S34–S39, or possibly none of the alternative operations S34–S39. The predetermined modification authorization may itself be based upon considerations of data security, data privacy, the likelihood of data corruption, or like data integrity considerations.

Upon conveying the alternative operations to the client A in step S28, the method proceeds to step S30. In the step S30 the client A is allowed to perform one or more authorized alternative operations after being denied the option of saving the modified record X over another client's modifications.

Figure 6:
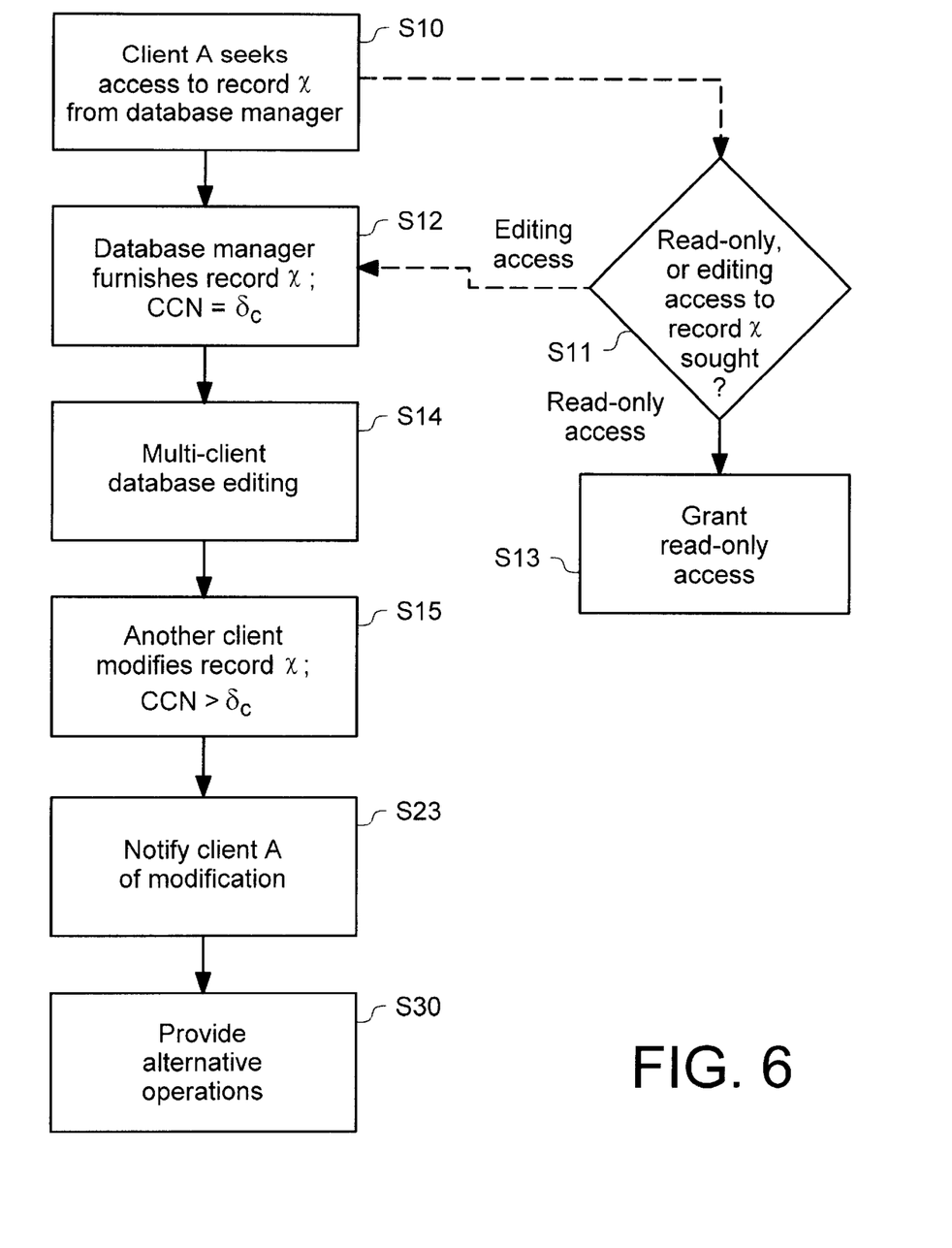
FIG. 6 depicts a method which provides warning of a potential data corruption situation according to an alternative embodiment of the present invention.

FIG. 6 depicts a method which provides warning when there is a potential data corruption situation, in accordance with an alternative embodiment of the present invention. This helps to avoid a data corruption situation by warning a client that the database has been modified subsequent to retrieval of the database record the client is accessing. In other words, if the client was not allowed to save the record being accessed, the database itself would not be corrupted. Rather, that client's modifications would be corrupted to the extend that the client would not be allowed to save them.

In step S10 of FIG. 6, the client A seeks to access record X of a database by contacting or requesting permission from the database manager controlling access to the database records. A decision step S11 can optionally be included in this embodiment or other embodiments of the method to determine whether client A seeks read-only access or access for editing purposes. If read-only access is sought, in accordance with the "YES" path of decision step S11, the method proceeds to step S13 and the client is prohibited from modifying the record X upon being granted access. In step S12, the database manager grants access and furnishes, or downloads a copy, of the record X, including a $CCV = \delta_c$, to client A. In step S14, multi-client database editing may take place in which other clients may edit the record X after it has been furnished to client A in step S12 with $CCV = \delta_c$.

In step S15, another client, for example, client B, edits or modifies the record X creating a modified version of the record X. Because of the record X being modified, the database manager increments the CCV so that it now equals $CCV = \delta_c + 1$. Then, in step S23, the database manager sends a warning to notify the client A that the record X has been modified by another client, thereby creating a potential data corruption situation. The warning notification could be sent in response to the client B saving the modified version of the record X, or could be sent in response to the creation of the modified version of the record X. For the latter case, the system would operate such that the client B would contact the database manager upon modifying the record X, before the record X had yet been saved. This would avoid the situation in which two client created extensive modifications to a database record making it difficult to incorporate both client's changes.

In addition to the warning message sent in step S23, the method may also include alternative operations for client A to follow as a result of the data corruption situation, in accordance with the step S30. The alternative operations may be consistent with those outline above in conjunction with FIG. 4, or like alternative operations known to practitioners skilled in the art.

It would be appreciated by those skilled in the art that the present invention can be embodied in other specific forms without departing from the spirit or essential characteristics thereof.

What is claimed is:

1. A multi-client database synchronization method for avoiding data corruption, the method comprising the steps of:
   contacting a database manager by a first client seeking to access a database record;
   allowing the first client access to the database record by the database manager;
   storing a change counter value by the database manager upon the first client accessing the database record, the change counter value being a first value which corresponds to the state of the database when the first client accessed the database record;
   saving a modified version of the database record having modifications made by a second client after the first client accessed the database record;
   incrementing the change counter value to a value of other than the first value in response to the second client saving the modified version of the database record;
   seeking to save the database record by the first client; and
   denying the first client from saving the database record by the database manager upon determining the change counter value has been incremented from the first value.

2. The method of claim 1, wherein the step of allowing the first client access to the database record by the database manager comprises the database manager granting permission to the first client to access the database record.

3. The method of claim 1, wherein the step of allowing the first client access to the database record by the database manager comprises the database manager monitoring the database record to determine that the database record has been accessed.

4. The method of claim 1, wherein the step of seeking to save the database record comprises seeking permission from the database base manager by the first client to save the database record.

5. The method of claim 1, further comprising the step of:
   providing alternative operations to the first client upon denying the first client from saving the database record.

6. The method of claim 5, wherein the alternative operations provided to the first client are based upon a predetermined modification authorization for the first client.

7. The method of claim 6, further comprising the step of:
   selecting at least one of the alternative operations by the first client.

8. The method of claim 1, further comprising the step of:
   conveying a list of alternative operations upon denying the first client from saving the database record;
   wherein said alternative operations comprises one or more of the steps of:
      updating the database record to reflect any modifications previously saved by a second client;
      saving the database record under a new file name;
      seeking permission from the second client by the first client to save the at least a portion of the database record;
      copying and pasting modifications of the database record, if any, to a clipboard;
      reviewing the second client's modifications, if any, by the first client before the first client saves the database record; or
      saving the database record over a corresponding database record previously saved by a second client.

9. A multi-client database synchronization method for avoiding data corruption of the data within the database or data to be added to the database, the method comprising the steps of:
   accessing a database record by a first client;
   storing a change counter value upon the first client accessing to the database record, the change counter value having a first value for the database record corresponding to the state of the database when the first client accessed the database record;
   creating a modified version of the database record with modifications by a second client after the first client accessed the database record; and
   notifying the first client of the modifications to the database record.

10. The method of claim 9, further comprising the step of:
    providing alternative operations to the first client upon denying the first client from saving the database record.

11. The method of claim 10, wherein the alternative operations provided to the first client are based upon a predetermined modification authorization for the first client.

12. The method of claim 11, further comprising the step of:
    selecting at least one of the alternative operations by the first client.

13. The method of claim 9, wherein the step of notifying the first client is performed in response to the second client saving the modified version of the database.

14. The method of claim 9, wherein the step of notifying the first client is performed in response to the second client creating the modified version of the database.

* * * * *